Patented Sept. 23, 1947

2,427,726

UNITED STATES PATENT OFFICE 2,427,726

PREPARING DRIED EGG PRODUCTS

Ervin W. Hopkins, Hinsdale, Ill., George Josh, Crown Point, Ind., and Louis A. Harriman, Chicago, Ill., assignors to Armour and Company, Chicago, Ill., a corporation of Illinois No Drawing. Application October 2, 1944, Serial No. 556,892

13 Claims. (Cl. 99—210)

This invention relates to the preparation of egg products, particularly dried egg products containing the whites and yolks of eggs.

The drying of shelled whole eggs is now in wide commercial practice. The dried whole egg products are particularly desirable for shipment to distant places and in warm climates. In the commercial practices heretofore employed fresh eggs are shelled and discharged under pressure from nozzles into a drying chamber in the form of a fine spray. The dried powder is removed from the bottom of the drying chamber and packaged for shipment.

Although there has been great effort on the part of the industry to remove the last traces of moisture in drying and although much work has been done trying to discover suitable preservatives which may be added to the dried whole egg products, there is yet a substantial amount of trouble with the dried whole egg product due to objectionable tastes and odors which develop upon shipment or storage especially in warm climates. Although it would be highly important to the industry and to the prosecution of the present war to have a process for preparing a dried whole egg product which would not be affected by holding for long periods of time, such a process has heretofore not been available.

It has been known that the whipping and keeping qualities of dried egg whites could be improved by pre-treating the whites before drying in a fermentation procedure. In the fermentation procedure the egg whites may be allowed to stand in large vats for five or six days. An improved process of this nature is described in the Fischer Patent No. 2,280,147. According to the process of this patent, the egg whites are acidified and are then subjected to extended bacterial fermentation, following which they are dried. During fermentation the whites are agitated and the scum which forms thereon is dissipated.

The methods above described for the treatment of egg whites have not been applicable to whole eggs. A whole egg mixture not under refrigeration cannot be held for substantial periods without spoilage, and no process which requires long periods of holding is applicable. It is not practical to hold whole egg mixtures for the times known to be necessary for fermentation of egg whites even with the aid of bacterial inoculation.

We are now of the belief that the off-flavors and odors which commonly develop in dried whole egg products are due to the presence of reducing sugar contained principally in the whites and to a lesser extent in the yolks.

We have now discovered that by inoculating the whole egg mixture with a bacterial culture, fermentation with the accompanying reduction in the amount of reducing sugar may be accomplished in a few hours and before the adventitious flora of the egg can develop to cause objectionable characteristics. It appears that the presence of the yolk enables bacterial action on the reducing sugar in the whites which is far in excess of such action on the whites in the absence of the yolk. At the present time we do not know the exact constituents or elements in the yolk which contribute this special influence.

Our improved process involves generally the inoculation of the mixture of egg whites and yolks with a culture of an organism which feeds upon reducing sugars, fermenting the inoculated mixture, and then drying the fermented mixture.

The organism may be an acid-forming organism such as Streptococcus lactis, Streptococcus diacetilactis, Lactobacillus casei, Lactobacillus bulgaricus, and Streptococcus thermophilus. Of these, Streptococcus lactis is especially effective. Other organisms which may be used are Ps. fluorescens, Alk. fecalis, and Aerogenes sp., but in general these latter named organisms are less suitable than the acid-forming organisms because in some cases they tend to encourage development of undesirable odor or flavor.

The preparation of cultures of such organisms is well understood in the art. Almost all organisms of this type grow well in beef broth or lactose broth. Lactobacillus bulgaricus grows well in milk. Broth or milk cultures 24 to 48 hours old are suitable. It is satisfactory to add about 1% of such cultures, but substantial variation in the amount of the cultures is permissible.

The following Table No. 1 gives a comparison of the sugar reduction effected by fermentation of whole eggs with inoculation by Streptococcus lactis as compared to a similar treatment for a like period without inoculation. The tests reported in this table were conducted using 300 to 500 milliliter quantities in Erlenmeyer flasks. Incubation was at 22 to 23° C.

Table 1

| Test No. | Original Sugar (mg. per 100 gm.) | Fermentation Time (hours) | Sugar After Incubation (mg. per 100 gm.) | |
|---|---|---|---|---|
| | | | Inoculated | Not Inoculated |
| 1 | 355 | 12 | 0 | 274 |
| 2 | 416 | 12 | 16 | 375 |
| 3 | 368 | 24 | 0 | 322 |
| 4 | 378 | 24 | 19 | 417 |
| 5 | 418 | 24 | 0 | 366 |

From the above table it will be seen that inoculating has a very marked effect on sugar reduction.

To compare the sugar reduction by different cultures on egg whites along with the sugar reduction of these same cultures under similar conditions on a mixture of egg whites and yolks we have fermented several batches of eggs in the laboratory under substantially aseptic conditions and the results of these tests are given in the following Table No. 2:

Table 2

| Inoculating Organism | Incubation Temperature | Sugar (mg. per 100 gm. of eggs) | | | |
|---|---|---|---|---|---|
| | | Before Fermentation | | After 1 day Fermentation | |
| | | Whole eggs | Whites | Whole eggs | Whites |
| | ° C. | | | | |
| Streptococcus lactis | 25 | 333 | 328 | 0 | 306 |
| Lactobacillus bulgaricus | 37 | 486 | 450 | 15 | 417 |
| Streptococcus diacetilactis | 32 | 393 | 458 | 0 | 432 |

From the above table it is clear that practically all sugar is eliminated from the mixed whites and yolks under conditions where a like amount of sugar in whites is reduced very little. This result can be explained by the influence of the yolk on the action of the organisms.

We further find that in addition to the inoculating step it is advantageous to acidify the whole egg mixture prior to fermentation. The acidification treatment is especially important in connection with the egg yolk influence since we find that the acid condition restricts development of the adventitious flora found in the egg yolk. In the acidification treatment acids such as hydrochloric acid, citric acid and other edible acids may be added to the egg mixture. Preferably the pH of the eggs should be reduced to about 6.0 but benefit may be obtained from any adjustment bringing the pH to below 7.0. Any pH of from 6.0 to 7.0 is found to be preferable to the natural pH of the eggs. At pH values below 5.5 the destruction of the reducing sugar proceeds more slowly and there is a tendency toward undesirable flavor changes.

Better results may be obtained by pasteurizing the eggs before the addition of the bacterial culture. This practice is found to further discourage development of unwanted fermentation and its accompanying effect on the quality of the product. Pasteurization may be effected by heating the eggs to at least 55° C.

The tests reported in the following Table No. 3 compare the sugar depletion through bacterial action in whole eggs when the eggs have been acidified with hydrochloric acid as to the sugar depletion under like circumstances where there is no pH adjustment. *Streptococcus lactis* is the organism used in inoculation.

Table 3

| Original Sugar (mg. per 100 gm. eggs) | Incubation Time (hours) | Data of Fermentation | | | | |
|---|---|---|---|---|---|---|
| | | Acidified | | | Not Acidified | |
| | | pG Values | | Sugar After Incubation (mg. per 100 gm. eggs) | pH Value | Sugar After Incubation (mg. per 100 gm. eggs) |
| | | Before Incubation | After Incubation | | Before Incubation | After Incubation | |
| 296 | 12 | 5.80 | 4.60 | 0 | 7.70 | 5.95 | 16 |
| 296 | ¹12 | 5.80 | 4.70 | 0 | 7.70 | 7.50 | 326 |
| 402 | 12 | 6.50 | 6.05 | 34 | 7.70 | 6.50 | 73 |
| 402 | ¹12 | 6.50 | 6.87 | 172 | 7.70 | 7.68 | 380 |

¹ Pasteurized before inoculation.

From the above table it may be noted that pasteurization extends somewhat the time necessary for sugar destruction but it may also be understood that pasteurization substantially extends the time required for adventitious flora to develop.

The foregoing detailed description of our improved processes is given for purposes of explanation and is not intended in a limited sense, it being understood that the improvements are subject to practice in many different ways, all within the spirit of the invention.

We claim:

1. A process for preparing dried egg products comprising inoculating a mixture of egg yolks and whites with a culture of organisms which feed upon reducing sugars, fermenting the inoculated mixture, and drying the fermented mixture.

2. A process for preparing dried egg products comprising inoculating a mixture of egg yolks and whites with a culture of an acid-forming bacteria, fermenting the inoculated mixture, and drying the fermented mixture.

3. A process for preparing dried egg products comprising removing the shells from a quantity of eggs, to a mixture of yolks and whites of said eggs adding a culture of an acid-forming bacteria, fermenting the mixture under the influence of said organism, and drying the fermented egg mixture.

4. A process as called for in claim 2 wherein said acid-forming organism is a lactic acid producing organism.

5. A process as in claim 1 wherein said fermented mixture is dried within 24 hours after said inoculation.

6. A process for preparing dried egg products comprising pasteurizing a quantity of egg yolks and whites, inoculating a mixture of said yolks and whites with a culture of an organism which feeds upon reducing sugars, fermenting the inoculated mixture, and drying the fermented mixture.

7. A process for preparing dried egg products comprising inoculating a mixture of yolks and whites with a culture of an organism which feeds upon reducing sugars, acidifying said mixture to a pH of between 6.0 and 7.0 fermenting the acidified inoculated mixture, and drying the fermented mixture.

8. In a process for preparing dried egg products the step of fermenting an egg mixture containing yolks and whites which mixture has been inoculated with an organism which feeds upon reducing sugar.

9. In a process for preparing dried egg products the step of fermenting an egg mixture containing yolks and whites which mixture has been inoculated with an acid-forming organism which feeds upon reducing sugar.

10. In a process for preparing dried egg products the step of fermenting an egg mixture containing yolks and whites which mixture has been inoculated with *Streptococcus lactis*.

11. In a process for preparing dried egg products the step of fermenting an egg mixture containing yolks and whites which mixture has been inoculated with *Lactobacillus bulgaricus*.

12. In a process for preparing dried egg products the step of fermenting an egg mixture containing yolks and whites which mixture has been inoculated with *Streptococcus thermophilus*.

13. In a process for preparing dried egg products the step of fermenting an acidified inoculated egg mixture containing yolks and whites which mixture has a pH of between 5.0 and 6.0 and which has been inoculated with an acid-forming bacteria.

ERVIN W. HOPKINS.
GEORGE JOSH.
LOUIS A. HARRIMAN.

REFERENCES CITED

The following references are of record in the file of this patent:

UNITED STATES PATENTS

| Number    | Name         | Date           |
|-----------|--------------|----------------|
| 1,818,214 | Epstein et al. | Aug. 11, 1931 |
| 2,358,324 | Frey et al.  | Sept. 19, 1944 |
| 2,056,082 | Tranin       | Sept. 29, 1936 |
| 2,212,445 | Littlefield  | Aug. 20, 1940  |
| 2,280,147 | Fischer      | Apr. 21, 1942  |

Disclaimer 2,427,726.—*Ervin W. Hopkins*, Hinsdale, Ill., *George Josh*, Crown Point, Ind., and *Louis A. Harriman*, Chicago, Ill. PREPARING DRIED EGG PRODUCTS. Patent dated Sept. 23, 1947. Disclaimer filed Feb. 2, 1949, by the assignee, *Armour and Company*.

Hereby enters this disclaimer to claims 1 to 6 inclusive, and claims 8 and 9 of said patent.

[*Official Gazette March 1, 1949.*]

feeds upon reducing sugars, fermenting the inoculated mixture, and drying the fermented mixture.

7. A process for preparing dried egg products comprising inoculating a mixture of yolks and whites with a culture of an organism which feeds upon reducing sugars, acidifying said mixture to a pH of between 6.0 and 7.0 fermenting the acidified inoculated mixture, and drying the fermented mixture.

8. In a process for preparing dried egg products the step of fermenting an egg mixture containing yolks and whites which mixture has been inoculated with an organism which feeds upon reducing sugar.

9. In a process for preparing dried egg products the step of fermenting an egg mixture containing yolks and whites which mixture has been inoculated with an acid-forming organism which feeds upon reducing sugar.

10. In a process for preparing dried egg products the step of fermenting an egg mixture containing yolks and whites which mixture has been inoculated with *Streptococcus lactis*.

11. In a process for preparing dried egg products the step of fermenting an egg mixture containing yolks and whites which mixture has been inoculated with *Lactobacillus bulgaricus*.

12. In a process for preparing dried egg products the step of fermenting an egg mixture containing yolks and whites which mixture has been inoculated with *Streptococcus thermophilus*.

13. In a process for preparing dried egg products the step of fermenting an acidified inoculated egg mixture containing yolks and whites which mixture has a pH of between 5.0 and 6.0 and which has been inoculated with an acid-forming bacteria.

ERVIN W. HOPKINS.
GEORGE JOSH.
LOUIS A. HARRIMAN.

REFERENCES CITED

The following references are of record in the file of this patent:

UNITED STATES PATENTS

| Number | Name | Date |
|---|---|---|
| 1,818,214 | Epstein et al. | Aug. 11, 1931 |
| 2,358,324 | Frey et al. | Sept. 19, 1944 |
| 2,056,082 | Tranin | Sept. 29, 1936 |
| 2,212,445 | Littlefield | Aug. 20, 1940 |
| 2,280,147 | Fischer | Apr. 21, 1942 |

Disclaimer 2,427,726.—*Ervin W. Hopkins*, Hinsdale, Ill., *George Josh*, Crown Point, Ind., and *Louis A. Harriman*, Chicago, Ill. PREPARING DRIED EGG PRODUCTS. Patent dated Sept. 23, 1947. Disclaimer filed Feb. 2, 1949, by the assignee, *Armour and Company*.

Hereby enters this disclaimer to claims 1 to 6 inclusive, and claims 8 and 9 of said patent.

[*Official Gazette March 1, 1949.*]